(No Model.) 2 Sheets—Sheet 1.

F. J. FERRELL.
STEAM TRAP.

No. 420,993. Patented Feb. 11, 1890.

Witnesses
Arthur Van Dielen
[signature]

Inventor
Frank J. Ferrell,
by Henry D. Williams
atty (No Model.) 2 Sheets—Sheet 2.

F. J. FERRELL.
STEAM TRAP.

No. 420,993. Patented Feb. 11, 1890.

Witnesses
Arthur Van Sicklen
Sidney Mann

Inventor
Frank J. Ferrell
by Henry D. Williams
Atty.

UNITED STATES PATENT OFFICE.

FRANK J. FERRELL, OF NEW YORK, N. Y.

STEAM-TRAP.

SPECIFICATION forming part of Letters Patent No. 420,993, dated February 11, 1890.

Application filed October 7, 1889. Serial No. 326,233. (No model.)

*To all whom it may concern:*

Be it known that I, FRANK J. FERRELL, a citizen of the United States, residing at New York, county and State of New York, have invented certain new and useful Improvements in Steam-Traps, of which the following is a specification.

This invention relates to steam-traps or devices for separating steam from the water of condensation or preventing the escape of steam while causing or permitting the escape of water, and has for its object the production of an improved automatic trap adapted to economically and efficiently perform the desired functions.

The trap comprises a chamber connected with the steam-pipes or other devices so as to receive the water of condensation, an outlet for the same, a float within the chamber, and a valve connected to the float and operated by the float to cause or permit the escape of water when the float is in higher position, and to check the escape of water when the float is in lower position. The float is pivoted on a shaft extending out through the chamber, and the valve is connected to the float-shaft, a toothed arm on the float-shaft and a toothed arm on a shaft connected to the valve-shaft, the teeth of the two arms meshing, forming my improved means of connecting the float and valve. The valve is of improved construction and especially adapted for use with steam-traps, as it is perfectly balanced and gives a large opening for a small movement of its stem.

My invention also embraces various improvements in the construction of various parts of the device, all of which will now be particularly described, reference being had to the accompanying drawings, forming part of this specification, in which—

Figure 1:
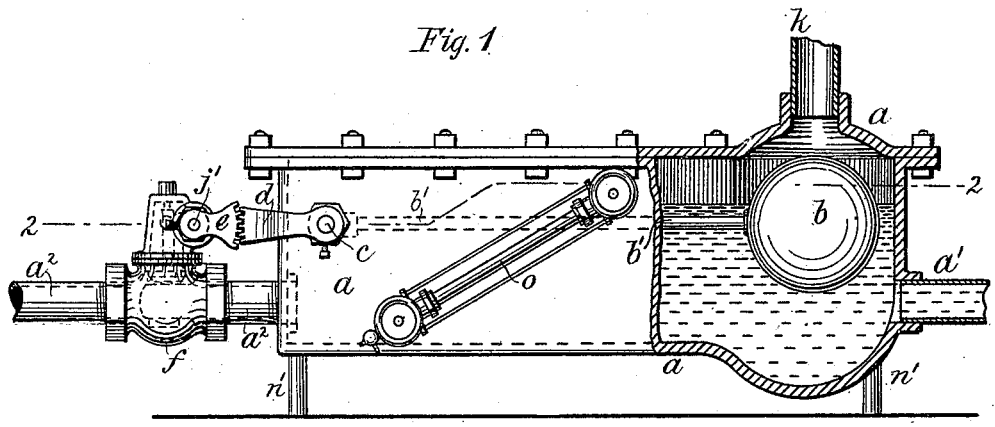
Figure 2:
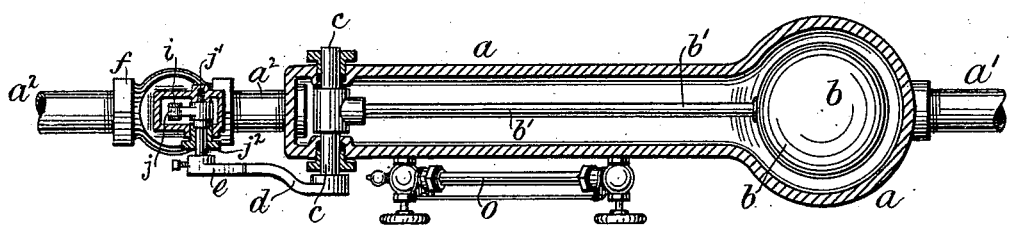
Figure 3:
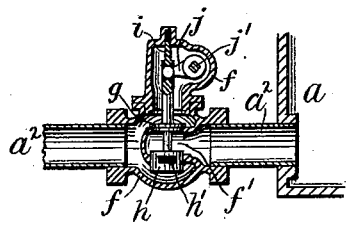
Figure 4:
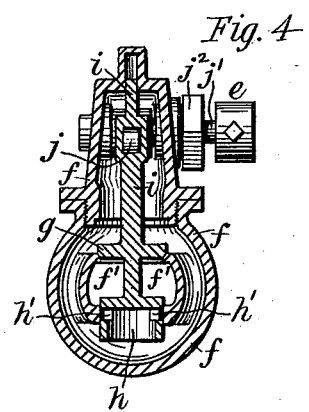
Figure 5:
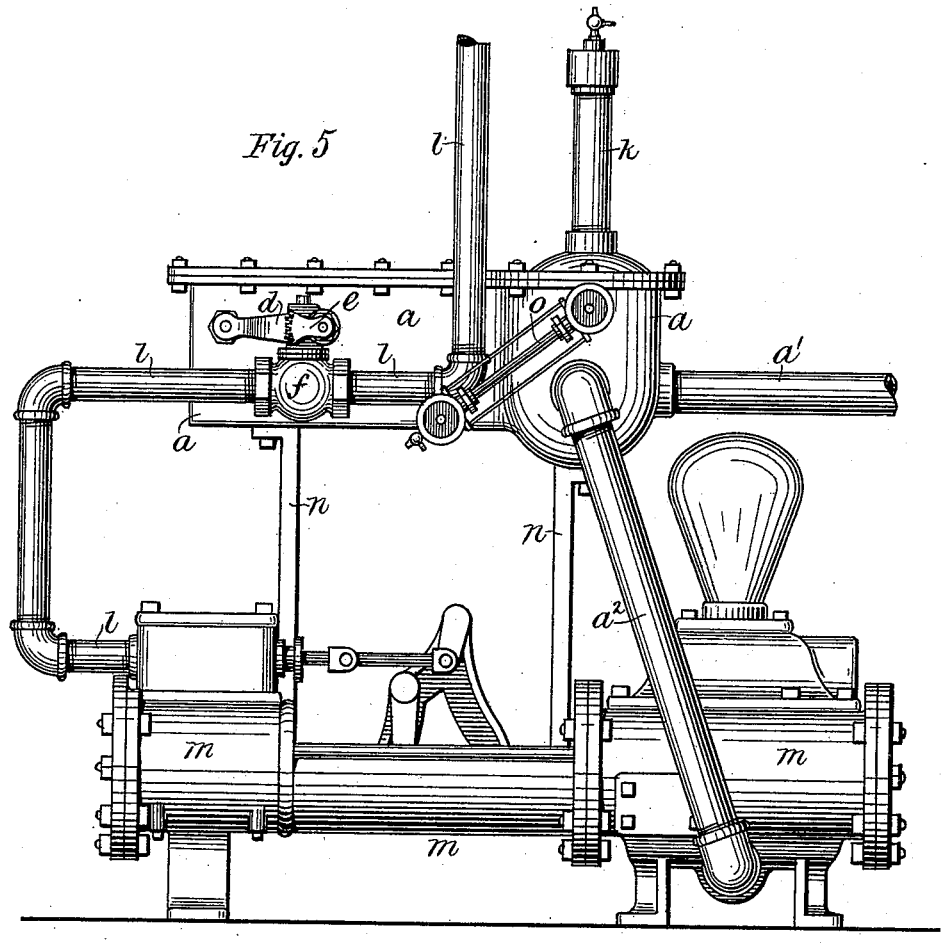

Figure 1 is a front elevation, partly in section, of my improved automatic steam-trap, showing the valve placed directly in the outlet-pipe for the water. Fig. 2 is a horizontal section of the same on the line 2 2, Fig. 1. Fig. 3 is a detached vertical longitudinal section of the valve and outlet-pipe. Fig. 4 is an enlarged vertical transverse section of the valve, and Fig. 5 is a front elevation showing my improved automatic steam-trap attached to a steam-pump with the valve placed in the steam-supply pipe of the steam-pump.

The chamber $a$ is preferably of cast-iron in the form of a hollow rectangular box, but with a somewhat cylindrical enlargement at one end to provide sufficient space for the float to work therein. The top of the box is detachable and secured thereto by bolts. An inlet-pipe $a'$ is provided for the steam and water of condensation, and an outlet-pipe $a^2$ for the water.

The float-ball $b$ is secured at the end of a long arm $b'$, secured to a shaft $c$, which is pivoted in bearings in the sides of the chamber $a$. The float-ball moves freely on the pivotal axis of this shaft $c$ and works up and down in the enlarged end of the chamber $a$. The bearings of the shaft $c$ are provided with or consist of stuffing-boxes to insure tight joints, and one end of the shaft projects outside of the box. Upon this outer end of the shaft $c$ is secured the toothed arm $d$, which meshes into a toothed arm $e$, secured on a valve or on a shaft operating the valve. The valve is of the double and balanced pattern, but is of improved construction. The casing $f$ is of globe form, with an interior chamber $f'$, which opens to one end of the casing and a space between the interior chamber and the outer shell of the casing which opens to the other end of the casing. The top and bottom of the interior chamber $f'$ are each provided with a valve-seat, the upper valve-seat being of conical form and the lower valve-seat of cylindrical form. The two valves $g$ and $h$ are secured to or form part of one stem $i$, which is vertically arranged. The upper valve $g$ is of the ordinary conical form and fits within the upper and conical valve-seat. The lower valve is cylindrical in form, and is fitted as a steam-tight piston within the lower and cylindrical valve-seat. The diameter of the cylindrical valve and seat is exactly equal to the smallest diameter of the upper conical valve, so that the pressures from the interior chamber $f'$ upon the upper and lower valves are exactly balanced. The passages of the lower cylindrical valve consist of the ports $h'$ $h'$, preferably placed diametrically opposite to balance the pressures therethrough, and these ports $h'$ $h'$ lead into a cavity in the valve, which is open at its lower end. The upper end of the valve-stem $i$ slides in a guide in the upper part of the casing $f$, which upper part may be cast as part of the casing or secured thereto, as shown. When the valve-stem is raised, the upper conical valve $g$ is lifted up clear of its seat and the lower cylindrical valve $h$ slides upward in its seat and exposes the ports $h'\ h'$. Thus the water or steam is allowed to escape at both the upper and the lower valve. When the stem is depressed, both valves are closed. It will be observed that slight variations in the closing point of the upper valve will not cause either valve to leak, as the closing point of the lower valve can be varied considerably without impairing its efficiency, hence the valve will always be tight, notwithstanding wearing away of the upper valve or slight changes in the length of the stem. It will also be observed that the lower edge of the opening for the upper conical valve is of exactly the same area as the upper edge of the lower cylindrical valve. This insures perfect equality of the pressures from the fluid in the passage $f'$ upon the two valves, and therefore perfect balancing of the valves.

Motion is imparted to the valve through the crank-arm $j$, working in a slot in the valve-stem $i$ and secured to a shaft $j'$, pivoted in bearings in the upper part of the casing $f$. One end of the shaft $j'$ extends through the casing $f$, and the bearing at this point is preferably made steam and water tight by means of the threaded sleeve $j^2$, bearing against an anti-friction metal collar on the shaft $j'$. To the outer end of the shaft $j'$ is secured the toothed arm $e$, which, as before described, meshes into the toothed arm $d$ of the float-ball shaft. The valve and float-ball are thus connected together, so that as the float-ball moves up and down and rocks its shaft $c$ the valve is operated through the toothed arms $d$ and $e$, the shaft $j'$, and the crank $j$. The upward movement of the float-ball $b$ tends to open the valve, and the downward movement of the float-ball $b$ tends to close the valve. The position of the float-ball depends upon the height of the water in the chamber $a$, and its connections with the valve are generally so adjusted that it will close the valve just before the outlet $a^2$ is uncovered.

The valve is connected to the water-discharging device. In the construction shown in Figs. 1, 2, and 3 it is placed directly in the water-outlet pipe $a^2$, and there operates in opening to permit the water to escape from the chamber and in closing to directly check the outflow of water. In the construction shown in Fig. 5 the valve is placed in the steam-supply pipe $l$ of the pump $m$, and the outlet-pipe $a^2$ runs directly to the water-cylinder of the pump. The valve operates in opening to permit steam to enter the pump and start the pump, and thus cause or permit the water in the chamber to escape and in closing to shut off the steam-supply of the pump and stop the pump, and thus check the outflow of water from the chamber.

When the trap is used to separate exhaust-steam of an engine or pump from water of condensation, I prefer the construction shown in Figs. 1, 2, and 3. The inlet-pipe is then connected so as to receive the exhaust-steam and water. The outlet-pipe $a^2$ runs to the sewer. The pipe $k$, secured to the top of the chamber just above the float, is the continuation of the exhaust and runs to the roof of the building or other place where the steam is discharged. The steam is thus allowed to escape through the pipe $k$, while all water of condensation is drained from the pipes, and, as it accumulates in sufficient quantities to cover the outlet, is allowed to escape to the sewer.

To use the construction shown in Figs. 1, 2, and 3 for draining a steam-heating system, it is only necessary to close the pipe $k$, so that steam will be retained within the trap and in the pipes until condensed, while the water of condensation will be drained away through the outlet $a^2$. The outlet-pipe will then preferably run into a tank, from which the water can be again pumped into the boiler; but the preferred construction, when the trap is used to drain a steam-heating system, is that shown in Fig. 5, as the water of condensation is thereby as fast as it accumulates pumped directly back into the boiler. The outlet-pipe $a^2$ in this connection, as before described, runs directly to the water-inlet of the pump $m$, and the valve is located in the steam-supply pipe $l$ of the pump. The only changes in the construction of my trap caused by this arrangement are in the location of the connection of the outlet-pipe $a^2$ near the right-hand end of the chamber and the slight change of position and arrangement of the valve and toothed arms; but these changes do not affect or change the operations of these devices. The trap is supported on legs $n\ n$, which are secured at their lower ends to the steam-pump, and which take the place of the supporting-legs $n'\ n'$ shown in Fig. 1. If it is not desirable to place the trap upon the pump, as shown, it may be placed in any other suitable position. When the pipe $k$ is closed, I prefer to extend it up to form an air-chamber and to provide its upper end with a small air-cock $k'$, as shown.

A water-tube $o$ is secured to the chamber $a$ to indicate the height of the water therein.

I hereby expressly reserve the right to separately claim the improved double valve in another application to be hereafter filed.

Having now described my invention, what I claim, and desire to secure by Letters Patent, is—

1. A steam-trap consisting of a chamber adapted to receive water of condensation, an outlet for the same, a float within the chamber, and a double valve connected to the water-discharging device and joined to the float so as to be operated thereby, and having a conical and a cylindrical valve-seat therein and a conical and a cylindrical valve on the same stem, the cylindrical valve tightly fitted in its seat, substantially as set forth.

2. A steam-trap consisting of a chamber adapted to receive water of condensation, an outlet for the same, a float pivoted within the chamber on a shaft extending out through the same, an arm on the float-shaft, and a double valve connected to the water-discharging device and joined to the shaft of the float so as to be operated thereby, and having a conical and a cylindrical valve-seat therein and a conical and a cylindrical valve on the same stem, the cylindrical valve tightly fitted in its seat, substantially as set forth.

3. A steam-trap consisting of a chamber adapted to receive water of condensation, an outlet for the same, a float pivoted within the chamber on a shaft extending out through the same, an arm on the float-shaft, a valve connected with the water-discharging device, a stem secured thereto, and a pivoted shaft having an arm connected to the valve-stem and an arm connected to the arm of the float-shaft, substantially as set forth.

4. A steam-trap consisting of a chamber adapted to receive water of condensation, an outlet for the same, a float pivoted within the chamber on a shaft extending out through the same, a toothed arm on the float-shaft, a double valve having a conical and a cylindrical valve-seat therein and a conical and a cylindrical valve on the same stem, the cylindrical valve tightly fitted in its seat and connected with the water-discharging device, and a pivoted shaft having an arm connected to the valve-stem and a toothed arm meshing into the toothed arm of the float-shaft, substantially as set forth.

5. A steam-trap consisting of a chamber adapted to receive water of condensation, an outlet for the same, a float within the chamber, and the valve connected with the water-discharging device and consisting of the casing $f$, the interior chamber $f''$, and the conical and the cylindrical valve-seat therein, the conical valve $g$, and the cylindrical valve $h$ on the stem $i$, the cylindrical valve tightly fitted in its seat and having ports $h'$ therein, substantially as set forth.

6. A steam-trap consisting of a chamber, an inlet for water and steam, an outlet for water, a float within the chamber, and a double valve connected to the water-discharging device and joined to the float so as to be operated thereby, and having a conical and a cylindrical valve-seat therein and a conical and a cylindrical valve on the same stem, the cylindrical valve tightly fitted in its seat, substantially as set forth.

7. A steam-trap consisting of a chamber, an inlet-pipe for water and steam, an outlet-pipe for water, an outlet-pipe for steam, a float within the chamber, and a double valve in the water-outlet pipe connected to the float so as to be operated thereby, and having a conical and a cylindrical valve seat therein and a conical and a cylindrical valve on the same stem, the cylindrical valve tightly fitted in its seat, substantially as set forth.

8. A steam-trap consisting of a chamber, an inlet-pipe for water and steam, an outlet-pipe for water, an outlet-pipe for steam, a float pivoted within the chamber on a shaft extending out through the same, an arm on the float-shaft, and a double valve in the water-outlet pipe joined to the arm of the float-shaft so as to be operated thereby, and having a conical and a cylindrical valve-seat therein and a conical and a cylindrical valve on the same stem, the cylindrical valve tightly fitted in its seat, substantially as set forth.

9. A steam-trap consisting of a chamber, an inlet-pipe for water and steam, an outlet-pipe for water, an outlet-pipe for steam, a float pivoted within the chamber on a shaft extending out through the same, a toothed arm on the float-shaft, a double valve in the water-outlet pipe having a conical and a cylindrical valve-seat therein, and a conical and a cylindrical valve on the same stem, the cylindrical valve tightly fitted in its seat, and a pivoted shaft having an arm connected to the valve-stem, and a toothed arm meshing into the toothed arm of the float-shaft, substantially as set forth.

10. A steam-trap consisting of a chamber, an inlet-pipe for water and steam, an outlet-pipe for water, an outlet-pipe for steam, a float within the chamber, and the valve in the water-outlet pipe consisting of the casing $f$, the interior chamber $f''$, and the conical and the cylindrical valve-seat thereon, the conical valve $g$, and the cylindrical valve $h$ on the stem $i$, the cylindrical valve tightly fitted in its seat and having ports $h'$ therein, and mechanism connecting the float with the valve-stem $i$, substantially as set forth.

11. A steam-trap consisting of a chamber, an inlet-pipe for water and steam, an outlet-pipe for water, an outlet-pipe for steam, a float pivoted within the chamber on a shaft extending out through the same, a toothed arm on the float-shaft, and the valve in the water-outlet pipe consisting of the casing $f$, the interior chamber $f''$, and the conical and cylindrical valve-seat therein, the conical valve $g$, and the cylindrical valve $h$ on the stem $i$, the cylindrical valve tightly fitted in its seat and having ports $h'$ therein, a pivoted shaft having an arm connected to the valve-stem $i$, and a toothed arm meshing into the toothed arm of the float-shaft, substantially as set forth.

FRANK J. FERRELL.

Witnesses:
HENRY D. WILLIAMS,
GEORGE McHUGH.